S. WHITMARSH.
COMPOSITION FOR FORMING MOULDED AND COATED ARTICLES.

No. 79,794. Patented July 7, 1868.

Witnesses:

Inventor:

United States Patent Office.

SAMUEL WHITMARSH, OF NORTHAMPTON, MASSACHUSETTS.

Letters Patent No. 79,794, dated July 7, 1868; antedated June 27, 1868.

---

IMPROVED COMPOSITION FOR FORMING MOULDED AND COATED ARTICLES.

---

*The Schedule referred to in these Letters Patent and making part of the same.*

---

TO ALL WHOM IT MAY CONCERN:

Be it known that I, SAMUEL WHITMARSH, of Northampton, in the county of Hampshire, and State of Massachusetts, have invented or discovered a new and useful Composition, applicable, among other purposes, as a substitute for hard rubber, of which the following is a full, clear, and exact description, reference being had to the accompanying drawing, forming part of this specification, and in which—

Figure 1:
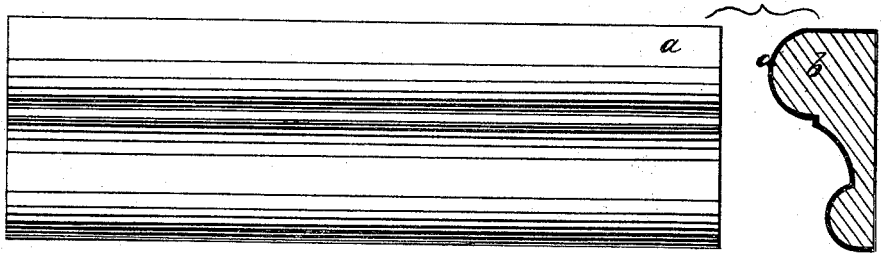

Figure 1 represents a longitudinal view and transverse section of a piece of wooden moulding having my improved composition applied to it, in imitation of veneer.

Figure 3:
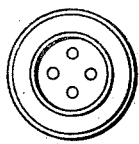
Figure 2:

Figure 2, a view, in perspective, of a cylinder made of said composition in its solid form, applicable as a piece in the game of "draughts" or "checkers," and Figure 3, a face view of a button made of said composition.

My invention or discovery consists in a composition made up of blood and asbestos, with or without the addition of other mineral or earthy matter, all ground and mixed together in certain or any proper and relative proportions, which will enable it either to be applied with a brush, or otherwise, as a coating to various articles in imitation of veneer, or be rolled, moulded, or otherwise fashioned in a solid form, into various bodies or articles, the same in either case, when dry or set, being preferably subjected to a high degree of temperature, whereby it is or may be made water-proof, without the aid of oils, and is rendered capable of receiving a high polish. In some cases but little or no asbestos may be used, but equivalents therefor of a mineral or earthy character substituted; thus with the blood may be mixed a smaller proportion of asbestos, and the deficiency in the amount of the latter article made up of china, clay, or powdered slate, ground flint, barytes, or any mineral powder, or any or all of these, or their equivalents; or ground slate, or other mineral powder of a suitable kind, conjointly with clay, may be used as the main or sole ingredients for admixture with the blood, the composition produced in every case to be afterwards baked, and its chemical character changed by exposure to a temperature of 350° Fahrenheit, or thereabouts.

It would be impossible here to enumerate all the varied articles or purposes to which this my improved composition is applicable, but among others may be mentioned furniture, buttons, knife-handles, pencil-cases, roofing-slates, and numerous articles or objects heretofore made of hard rubber, which it is pre-eminently a substitute for, being, after exposure to heat, as described, of a hard and close-grained character, water-proof, and susceptible of a polish equal, or nearly so, to that of marble.

In illustration of how this my invention is or may be carried into practice, take, (say,) one and a half pound $(1\frac{1}{2}$ lb.) of blood, as it is found in the slaughter-house, and add to it one pound (1 lb.) of asbestos, or a reduction to two-thirds $(\frac{2}{3})$ of a pound (more or less) of the latter, and, in place of such reduction, (say,) one-third $(\frac{1}{3})$ of a pound of china clay, powdered slate, or other ground mineral matter, the whole to be afterwards ground together in a mill for grinding or mixing liquids.

The article thus produced is then in a condition to be applied to the purpose for which it is intended. This may either be done by a brush, by laying on successive coats or layers, as in fig. 1, where the composition, $a$, is used as a substitute for veneer, to a wooden moulding, $b$, stirring the mixture from time to time to keep it from settling, and preserving it in a limpid form for use by the brush; or it may be run or pressed into moulds, or be allowed to set in suitable form, till sufficiently solid and relieved of stickiness, to be rolled into sheets or strips, or be otherwise manipulated, for the production of the articles shown in figs. 2 or 3, or other solid, or, it may be, hollow bodies.

For making buttons and certain other articles, the same may be stamped or worked out of the sheet thus formed by means of cold-presses and dies, and be pierced, where necessary, by the same blow, instead of employing heated dies, as in making the same articles of hard rubber. The solid or veneered article thus produced should afterwards be exposed, in any suitable heater, to a temperature of 350° Fahrenheit, or thereabouts, for a varied interval or period dependent upon the thickness of the said composition to be treated, when its chemical nature will be found to have been changed, giving to such composition a water-proof character, great hardness, and a surface capable of receiving a high degree of polish.

Said composition is not only cheaper than hard rubber, but may be quicker worked in the production of various articles, and will be found superior to it in several other respects.

Of course any desired and suitable coloring-matter may be added to the blood and mineral matter of which this composition is formed.

In view of its great hardness I denominate this composition "agatite."

What I claim as my discovery, and desire to secure by Letters Patent, is—

1. The combination of blood with asbestos, for the production of a composition applicable either in a liquid or solid form, substantially as specified.

2. A composition, made up of blood and mineral or earthy matter, mixed or ground together, and afterwards exposed to a temperature of 350° Fahrenheit, or thereabouts, to give to it a hard and water-proof character, essentially as herein set forth.

SAMUEL WHITMARSH.

Witnesses:
HENRY T. BROWN,
A. LE CLERC.